(12) United States Patent
Lafont

(10) Patent No.: US 8,646,725 B2
(45) Date of Patent: Feb. 11, 2014

(54) ENGINE ASSEMBLY FOR AN AIRCRAFT THE ENGINE ATTACHMENT STRUT OF WHICH INCLUDES A STRUCTURAL CASE FORMING AN INTERNAL RADIAL DELIMITATION OF THE SECONDARY FLOW

(75) Inventor: Laurent Lafont, Pechbusque (FR)

(73) Assignee: Airbus Operations S.A.S., Toulouse (FR)

( * ) Notice: Subject to any disclaimer, the term of this patent is extended or adjusted under 35 U.S.C. 154(b) by 100 days.

(21) Appl. No.: 13/383,542

(22) PCT Filed: Jul. 29, 2010

(86) PCT No.: PCT/FR2010/051617
§ 371 (c)(1),
(2), (4) Date: Jan. 11, 2012

(87) PCT Pub. No.: WO2011/012822
PCT Pub. Date: Feb. 3, 2011

(65) Prior Publication Data
US 2012/0111995 A1    May 10, 2012

(30) Foreign Application Priority Data
Jul. 31, 2009    (FR) ..................................... 09 55425

(51) Int. Cl.
*B64D 27/26*    (2006.01)
*B64D 29/00*    (2006.01)
*F02K 1/56*    (2006.01)

(52) U.S. Cl.
USPC ........................................ 244/54; 244/110 B

(58) Field of Classification Search
USPC ........... 244/54, 110 B; 248/554–557; 60/796, 60/797, 226.2
See application file for complete search history.

(56) References Cited

U.S. PATENT DOCUMENTS 3,568,446 A * 3/1971 Mullins et al. ............... 60/226.2
4,412,774 A * 11/1983 Legrand et al. ................. 244/54
4,683,717 A    8/1987 Naud
4,785,625 A    11/1988 Stryker et al.

(Continued)

FOREIGN PATENT DOCUMENTS

EP        1 568 868        8/2005
WO     2008 000924        1/2008

OTHER PUBLICATIONS

International Search Report issued on Feb. 4, 2011 in PCT/FR10/051617 filed on Jul. 29, 2010.

*Primary Examiner* — Tien Dinh
*Assistant Examiner* — Richard R Green
(74) *Attorney, Agent, or Firm* — Oblon, Spivak, McClelland, Maier & Neustadt, L.L.P.

(57) ABSTRACT

An engine assembly for an aircraft including a dual-flow turbomachine and an attachment strut. The turbomachine includes a structural case extending downstream of the hub of an intermediate casing, the case contributing to the internal radial delimitation of a passage for a secondary flow of the turbomachine. Also, the primary structure includes a structural case, assembled on the structural case and positioned directly downstream of the structural case such that it also contributes to the internal radial delimitation of the passage for the secondary flow. The primary structure also includes an offset structure positioned in the passage, and configured to connect the case to an element of the aircraft. The structural case also includes a thrust reversal system.

12 Claims, 8 Drawing Sheets

(56) References Cited

U.S. PATENT DOCUMENTS

| | | | |
|---|---|---|---|
| 5,226,288 A * | 7/1993 | Cornax | 60/797 |
| 5,524,846 A * | 6/1996 | Shine et al. | 60/796 |
| 5,915,651 A * | 6/1999 | Asaki et al. | 244/110 B |
| 6,050,522 A * | 4/2000 | Brossier et al. | 244/110 B |
| 7,797,947 B2 | 9/2010 | Lafont et al. | |
| 8,038,092 B2 | 10/2011 | Diochon et al. | |
| 2005/0172609 A1 | 8/2005 | Beutin et al. | |
| 2009/0255271 A1 | 10/2009 | Vauchel et al. | |

* cited by examiner

ENGINE ASSEMBLY FOR AN AIRCRAFT THE ENGINE ATTACHMENT STRUT OF WHICH INCLUDES A STRUCTURAL CASE FORMING AN INTERNAL RADIAL DELIMITATION OF THE SECONDARY FLOW

TECHNICAL FIELD

The present invention relates generally to the field of dual-flow turbomachine attachment struts for aircraft, in particular for dual-flow turbojets.

STATE OF THE PRIOR ART

From the prior art various designs of twin-jet turbojet attachment struts are known, notably from document EP-A-1 883 578.

In this document the primary force-transmission structure of the strut is produced from a central box, either side of which extend two lateral boxes, where the entire assembly roughly forms a half-case located directly downstream of a fan casing, and centred on the engine axis. In addition, the inner surface of this half-case contributes to the outer radial delimitation of a passage for a secondary flow of the turbojet. Consequently, the primary structure of the strut extends radially towards the outside at a substantial distance from the engine axis, making its design relatively heavy and bulky, and therefore expensive.

In addition, it protrudes radially towards the outside and upwards relative to the fan casing, over a substantial radial length. Consequently, preserving sufficient ground clearance may lead the strut to be located in a part beyond the crest line defined by the wing to which it is attached. This leads to non-negligible aerodynamic losses, and therefore reduced overall performance.

SUMMARY OF THE INVENTION

The purpose of the invention is therefore to provide at least partially a solution to the disadvantages mentioned above, compared with the embodiments of the prior art.

To accomplish this, the first object of the invention is therefore an engine for an aircraft including a dual-flow turbomachine and a strut for mounting said turbomachine intended to be connected to an element of the aircraft, where the turbomachine includes a fan casing and also an intermediate casing positioned downstream of the fan casing and including a hub supporting structural arms, and where the attachment strut includes a primary structure for transmitting forces.

According to the invention, said turbomachine includes a first structural case extending downstream of the hub of said intermediate casing, where this case contributes to the internal radial delimitation of a passage for a secondary flow of the turbomachine.

In addition, said primary structure of the attachment strut includes a second structural case, assembled on said first structural case, and positioned directly downstream of the latter, in order that it may also contribute to the internal radial delimitation of the passage for the secondary flow, where said primary structure of the attachment strut also includes an offset structure positioned in the passage for the secondary flow, and intended to connect said second structural case to said aircraft element. In addition, said second structural case includes a thrust reversal system.

The invention is noteworthy in that it provides a primary attachment strut structure including a structural case located very close to the engine axis. Its overall dimensions and also its global mass are consequently advantageously reduced. In addition, with the attachment between the two structural cases, each extending all the way around the engine axis, the momentum being exerted in the transverse direction of the turbomachine can be transmitted extremely satisfactorily, thereby greatly reducing the bending of the turbomachine in this direction.

In addition, if the turbomachine is intended to be assembled under a wing of the aircraft, another advantage lies in the fact that it is possible to install the strut on the wing without it reaching the crest line defined by the latter, and preserving sufficient ground clearance under the turbomachine, again due to the fact that the second structural case is installed very close to the engine axis.

Finally, the integration of a thrust reversal system in the second structural case enables a compact and efficient engine assembly to be obtained.

A junction between the first and second structural cases is preferably located downstream of a combustion chamber of the turbomachine. This implies that the primary structure of the strut is positioned further back, contrasting with the prior embodiments. In addition, this arrangement means that it is it possible not to hinder the access which is generally required to the equipment located upstream from the combustion chamber, known as the "core" area. Finally, since the primary structure is not located in alignment with the combustion chamber, there is no risk of it being damaged by any flame which might be released from this chamber.

A downstream end of said second case is preferably located close to a junction between a gas generator casing of the turbomachine and a gas injection casing of it.

This results in a very short axial length of the second case of the attachment strut, leading to smaller dimensions.

Said first and/or second structural case is preferably connected to a gas generator casing of the turbomachine using multiple connecting rods distributed circumferentially and positioned roughly tangentially relative to said gas generator casing.

Also preferentially, an alternative solution to the previous one, or one which may be combined with it, involves having the second structural case connected to a gas generator casing of the turbomachine, and/or a gas injection casing of it, through multiple preload spring systems positioned circumferentially.

Said first structural case is preferably perforated by access panels covered by one or more shutters.

Another object of the invention is an aircraft including at least one engine assembly as described above, where said element to which the attachment strut of the engine assembly is connected is preferentially one of its wings, or a rear part of its fuselage.

Finally, the invention also relates to a method for assembling an engine assembly described above, where said method includes the steps consisting in:

installing, in a removable manner, guide means on the second structural case;

moving the dual-flow turbomachine along the direction of its axis, in the direction of the second structural case, such that its first case is guided by said guide means; and removing said guide means from the second structural case.

The special feature therefore lies here in the positioning of removable guide means on the second case of the strut, enabling the turbomachine to be centred relative to this second case through which this turbomachine is intended to penetrate.

Other advantages and characteristics of the invention will appear in the non-restrictive detailed disclosure below.

BRIEF DESCRIPTION OF THE DRAWINGS

This description will be made with reference to the attached illustrations, among which.

DETAILED DESCRIPTION OF PREFERRED EMBODIMENTS

Figure 1:
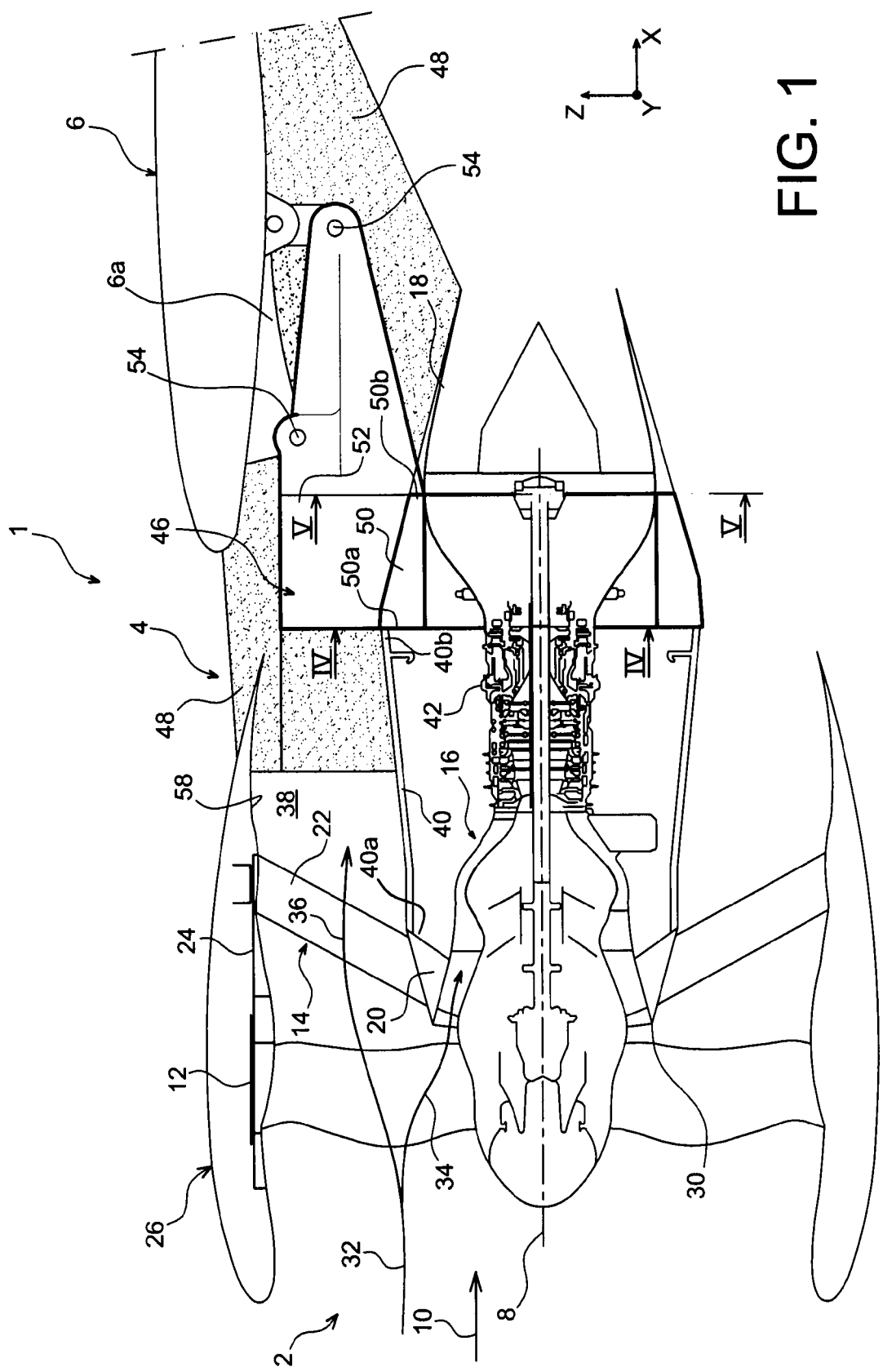
FIG. 1 represents a longitudinal half-section view of an engine assembly for aircraft, according to a preferred embodiment of the present invention, suspended under a wing of an aircraft.

With reference to FIG. 1, an engine assembly 1 for aircraft, according to a preferred embodiment of the present invention, can be seen.

This assembly 1 includes, globally, a dual-flow turbomachine, here preferentially a turbojet 2, and an attachment strut 4 enabling the turbojet to be suspended under an aircraft wing 6.

Throughout the following description, by convention, the longitudinal direction of the turbojet, which is parallel to a longitudinal axis 8 of the latter, and also called the engine axis, is called X. In addition, the direction aligned transversely relative to the turbojet is called Y, and the vertical direction, or direction of the height, is called Z, and these three directions X, Y and Z are mutually orthogonal.

In addition, the terms "upstream" and "downstream" must be considered relative to a principal flow direction of the gases within the turbojet, where this direction is represented schematically by arrow 10.

In FIG. 1, it can be seen that turbojet 2 includes multiple casings attached in secure fashion to one another, namely, in succession from upstream to downstream, a fan casing 12, an intermediate casing 14, a central casing, also called a gas generator casing, 16, and lastly a gas ejection casing 18. In respect of the intermediate casing, this has a hub 20 centred on axis 8, from which arms 22 supporting an outer ferrule of this casing 14 extend radially. Ferrule 24 is positioned directly downstream of fan casing 12 to which it is attached, and a nacelle 26 of the turbojet surrounds both these elements 12, 24.

Hub 20 is positioned downstream of a flow separation nozzle 30, which acts to separate flow 32 entering in the fan into a primary flow 34 traversing the gas generator, and a secondary flow 36 intended to pass through an annular passage 38 installed for this purpose, also called a secondary annular channel.

In addition to the different casings mentioned above, some of which can be manufactured together from a single part, the turbojet includes a first structural case 40 extending downstream of hub 20, roughly in direction X and centred on axis 8. Its downstream end 40b is preferably located in a position just downstream of combustion chamber 42 of the turbojet, in a transverse plane. Its upstream end 40a, which is also annular, is attached by means of bolts on to the hub, with multiple bolts (unrepresented) distributed circumferentially. The substantial number of bolts spaced relative to one another on the upstream end 40a enables the detrimental effects of ovalisation of case 40 to be prevented optimally, while the turbojet is in operation.

In respect of attachment strut 4, it has a primary force-transmission structure 46, also called a rigid structure, together with secondary structures 48 used essentially for containing the equipment and for forming aerodynamic structures making a junction between wing 6 and turbojet 2. It can be seen here that primary structure 46 includes a second structural case 50, which is also centred on axis 8, and attached in secure fashion to the downstream end 40b of first case 40. Thus, as mentioned above, the junction between the first and second cases 40, 50 is located downstream of combustion chamber 42, and preferably in a transverse plane located just at the outlet from the latter, as has been represented. In addition, primary structure 46 includes an offset structure 52 extending in direction Z from case 50, and also in direction X towards the rear, as has been schematically represented in FIG. 1. It can, indeed, be seen that this structure 52 has in its rear part means 54 allowing primary structure 46 to be mounted on structural part 6a of wing 6.

In this engine assembly 1 passage 38 of secondary flow 36 is delimited in the outer radial direction by an inner surface 58 of nacelle 26. In addition, the internal radial delimitation of this passage 38 is provided firstly by hub 20 of intermediate casing 14, and then by the outer surface of structural case 40 enclosing a portion of gas generator casing 16, and finally by the outer surface of structural case 50 located directly downstream of first case 40. Thus, offset structure 52 extends vertically through passage 38 of the secondary flow, as do the secondary structures 48 of attachment strut 4.

As can be seen in FIG. 1, downstream end 50b of structural case 50 is located close to a junction between gas generator casing 16 and ejection casing 18. Consequently, second structural case 50 of the attachment strut extends only over a relatively limited axial portion, between the combustion chamber and gas ejection casing 18. For reasons relating to the assembly of the turbomachine on case 50, the inner surface of the latter has a diameter greater than the largest diameter of the portion of turbomachine 1 located in the area of the junction between gas generator casing 16 and ejection casing 18.

Figure 2A:
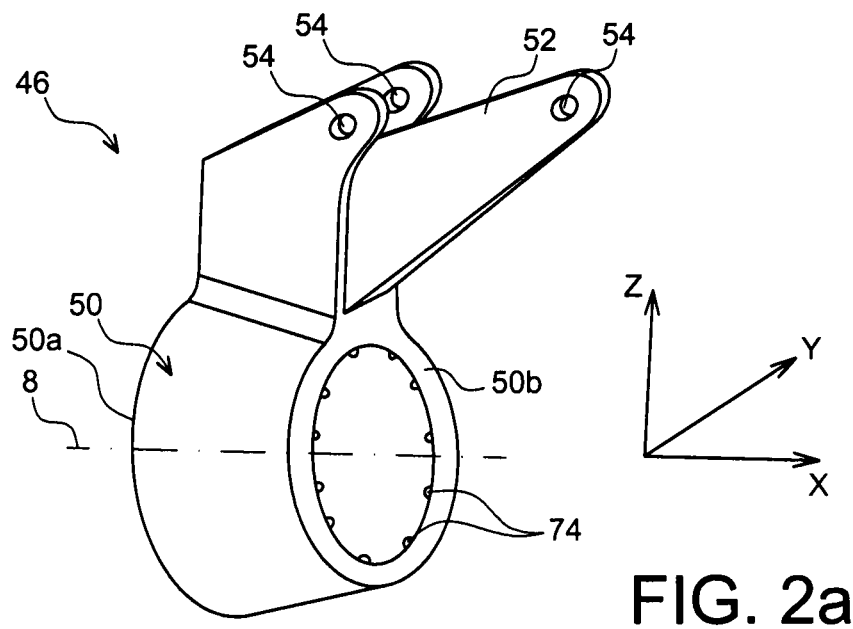
FIGS. 2a and 2b show two perspective views of the primary force-transmission structure of the attachment strut belonging to the engine assembly shown in FIG. 1, seen from two different angles of view.
Figure 2B:
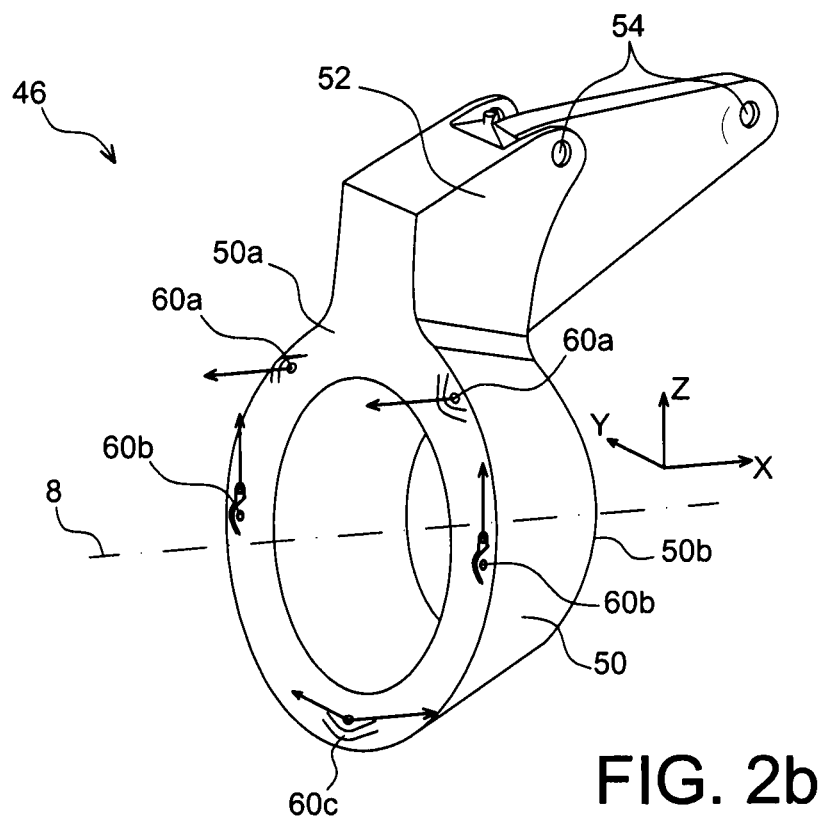

With reference at present to FIGS. 2a and 2b, primary structure 46 of the attachment strut can be seen. This can be manufactured from a single part, or indeed using elements attached securely one to another. Whatever the case, structural case 50 does indeed form a roughly annular and continuous structure all the way around engine axis 8, through which the downstream end of gas generator casing 16 is intended to penetrate. It is also fitted with a thrust reversal system, which has not been represented in FIGS. 1, 2a and 2b, but only in FIGS. 6 and 7.

On front end 50a of this case, attachment means are included which are intended to co-operate with additional means for attaching the downstream end of the first structural case. These attachment means include, for example, two upper attachments 60a positioned either side of a median vertical plane (unrepresented), each of which is intended to transmit forces being exerted only along direction X. They can also include two intermediate attachments 60b, positioned either side of the abovementioned median vertical plane, and also traversed by a diametral plane of this case. Each of them is, here, intended to transmit only forces being exerted in direction Z. Lastly, these means include a lower attachment 60c traversed by the median vertical plane, and intended to transmit the forces being exerted in direction X and in direction Y, but not in direction Z. This enables assembly means to be obtained, on the first structural case, which form an isostatic assembly system.

Figure 3A:
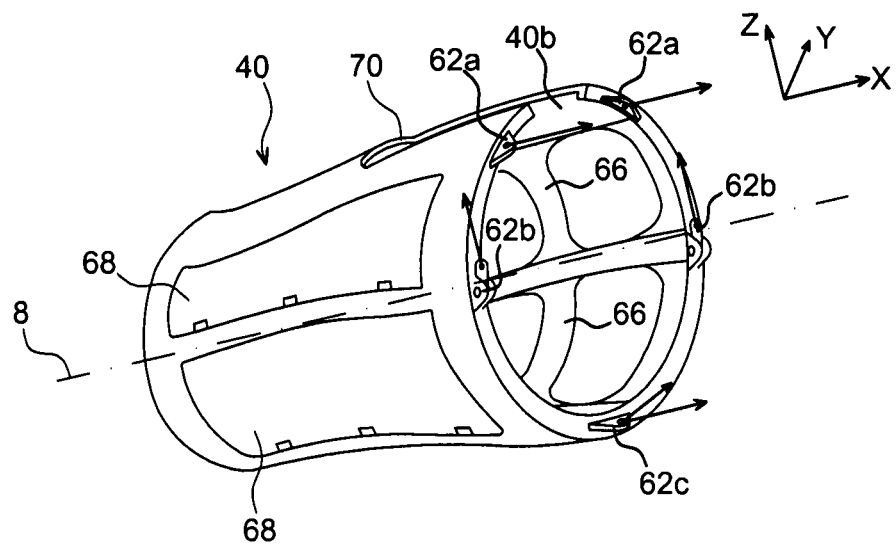
FIGS. 3a and 3b show two perspective views of the first structural case fitted to the turbomachine belonging to the engine assembly shown in FIG. 1, seen from two different angles of view.
Figure 3B:
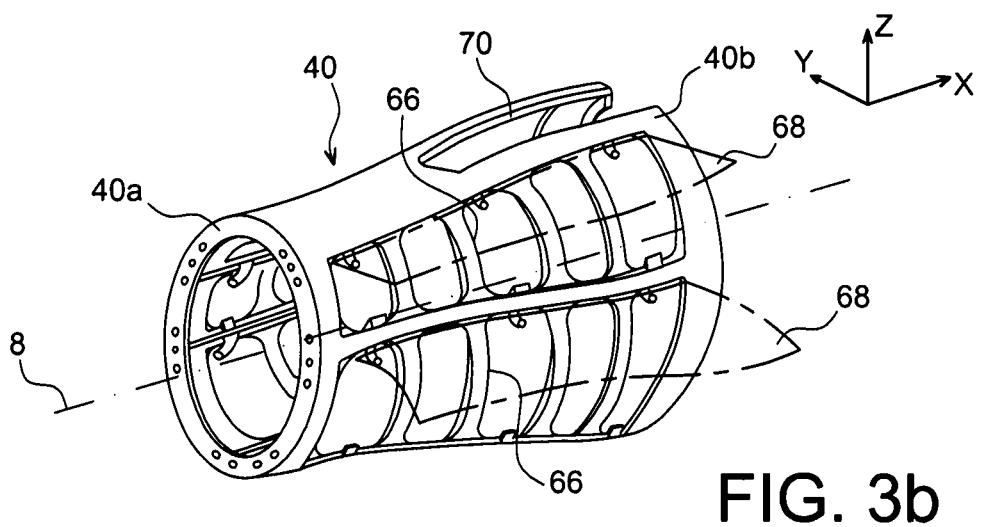

With reference at present to FIGS. 3a and 3b, first structural case 40 can be seen, which is also preferably manufactured from a single piece, or again obtained by attaching multiple elements to one another. At the downstream end 40b of this case additional attachments 62a, 62b and 62c, intended to be assembled on attachments 60a, 60b, 60c, which are positioned opposite them, respectively, can be seen.

In addition, it can be seen that structure 40 is perforated by access panels 66 intended to allow access to the turbojet's gas generator casing, where these panels 66 are closed by hinged shutters 68 connected to this same structure 40. Thus, in the closed position as shown in FIG. 3a, the shutters located externally cover the panels 66, and therefore contribute to the internal radial delimitation of the turbojet's secondary flow. Conversely, when handling operations must be undertaken on the engine, the shutters can be pivoted in the schematic fashion shown in FIG. 3b, in order to release the panels 66, and therefore allow access to the interior space delimited by this structure 40.

Finally, as has been represented schematically in FIGS. 3a and 3b, case 40 can have a slit 70 open at the top rear in order to allow the secondary structures 48 of the attachment strut to pass through.

Figure 4:
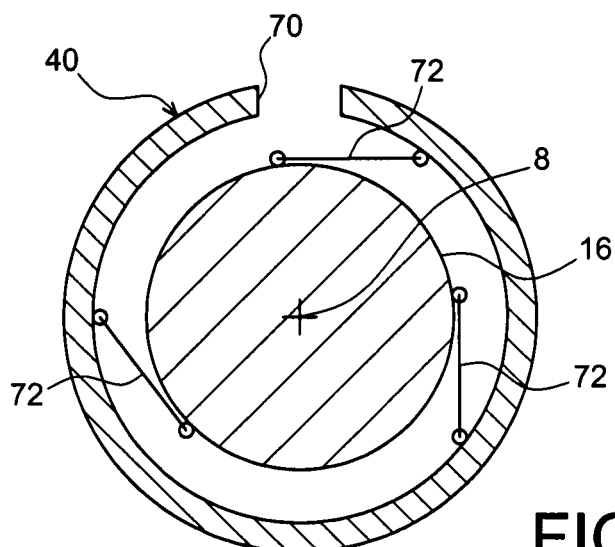
FIGS. 4 and 5 represent section schematic views shown along lines IV-IV and V-V of FIG. 1, respectively.

Although this has not been represented in FIG. 1, first structural case 40 is connected to gas generator casing 16 using multiple connecting rods 72 distributed regularly and circumferentially, for example three such connecting rods, as shown in FIG. 4. Generally, this arrangement in which the connecting rods are connected to each of their ends enables the phenomenon of differential thermal expansion between casing 16 and structure 40 to be addressed. This junction by connecting rods 72 can, alternatively, be made to upstream end 50a in second structural case 50.

Figure 5:
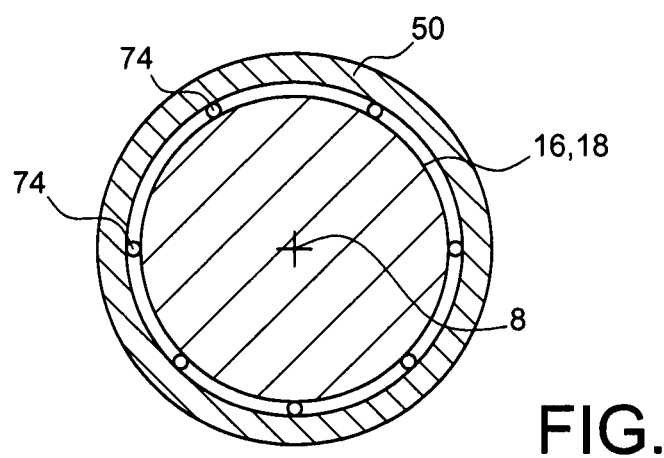

Alternatively or simultaneously, downstream end 50b of structural case 50 can be connected to gas ejection casing 18 or to gas generator casing 16, or again to the junction between the latter, through systems 74 distributed regularly and circumferentially around axis 8. These systems 74, shown in FIG. 5, include preload springs enabling the relative movements between these two elements 50, 18, between which they are located, to be absorbed.

Figure 6:
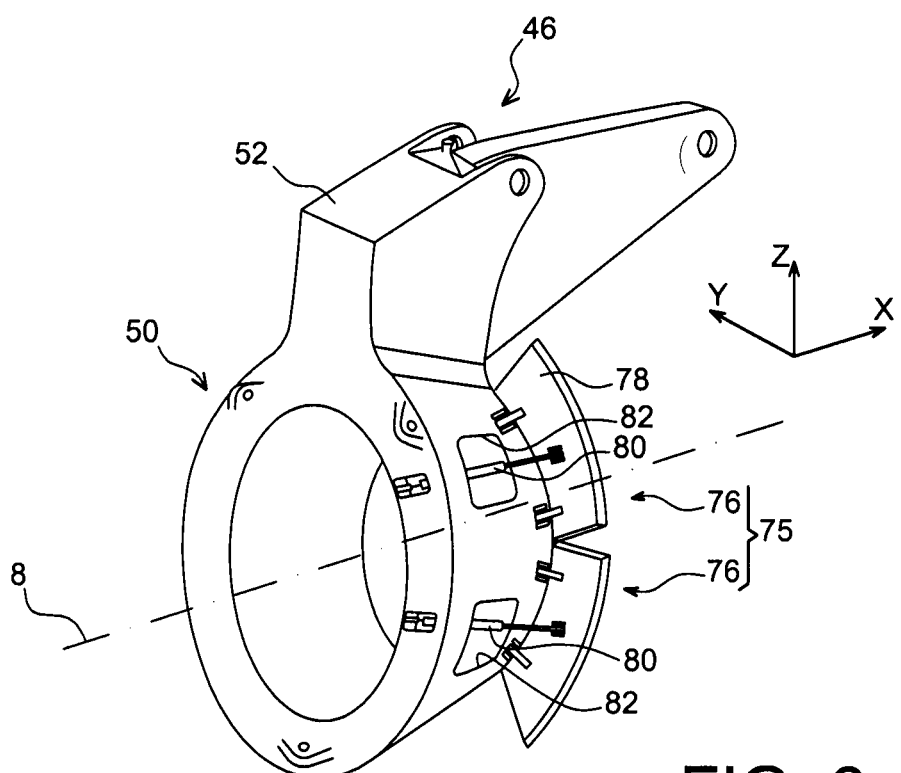
FIG. 6 represents a view similar to that of FIG. 2b, but in greater detail, showing in particular the thrust reversal system fitted to the primary force-transmission structure.

With reference at present to FIG. 6, primary structure 46 of the attachment strut can be seen in greater detail. This structure includes, indeed, a thrust reversal system, here based on a design called a hinged shutter design. Other designs of thrust reversal systems can nonetheless be envisaged, without going beyond the scope of the invention.

Thus, thrust reversal system 75 includes multiple units 76 each including a shutter 78 the rear end of which is connected to case 50. During normal operation of the turbojet, shutters 78 are intended to be pressed against the outer surface of structural case 50, so as to form with it the internal radial delimitation of the passage for the secondary flow. This position is shown in the lower part of FIG. 7, where it is possible to see that shutters 78 are connected in the area of downstream end 50b of case 50. In addition, in this configuration of normal operation of the turbojet, each shutter 78 has a front end which preferably covers the junction between the two structural cases 40, 50.

To deploy shutter 78, each assembly 76 includes actuation means of the jack type 80 traversing an aperture 82 which is covered by shutter 78 in folded position. Thus, when jack 80 is deployed following a command to activate the thrust reversal system, shutter 78 pivots on its rotational axis and is progressively deployed in the passage 38 of the secondary flow. Naturally, all the shutters 78, distributed circumferentially around axis 8, are deployed simultaneously.

Figure 7:
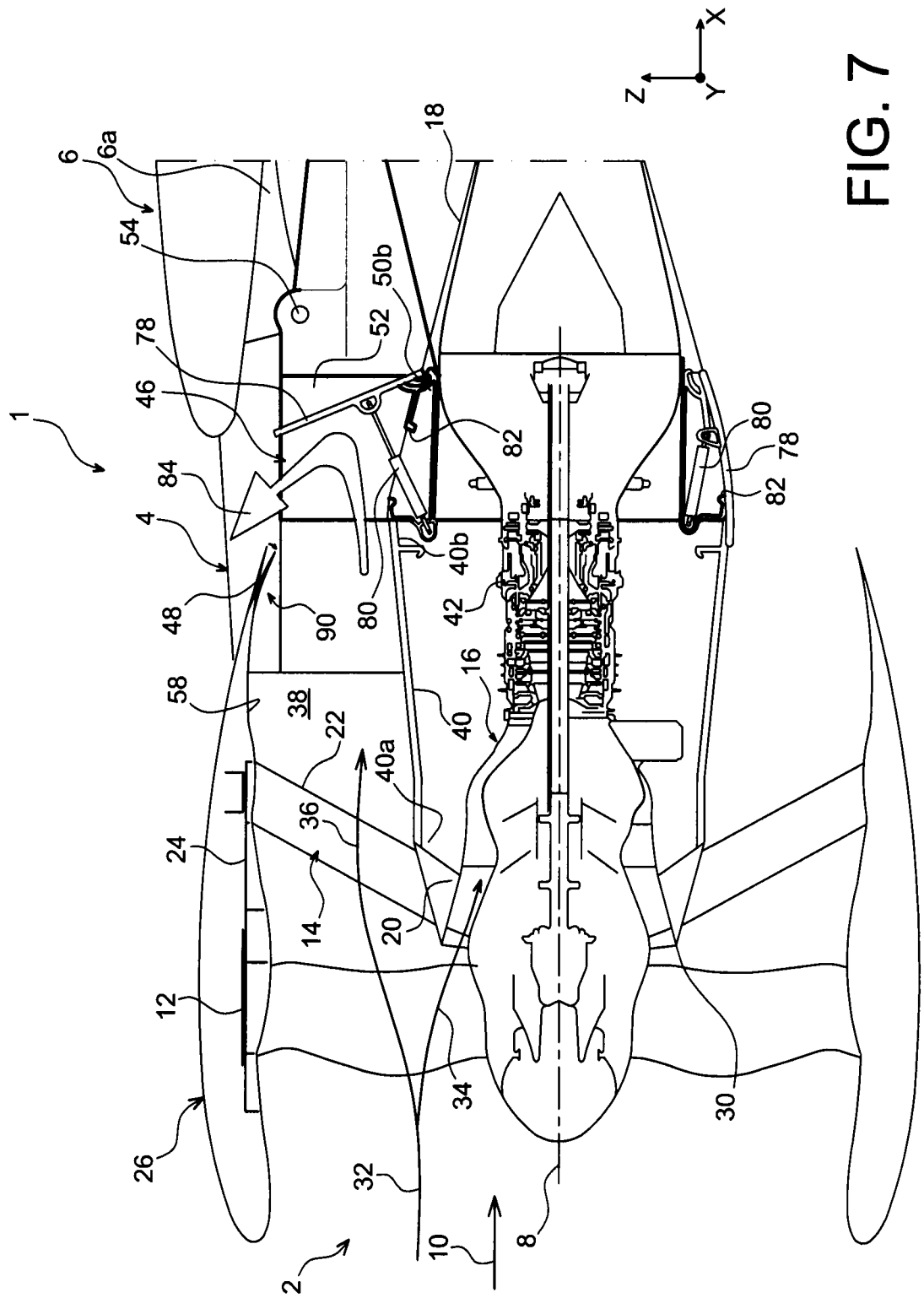
FIG. 7 represents a view similar to that of FIG. 1, but in greater detail, showing in particular the thrust reversal system fitted to the primary force-transmission structure.

When all the shutters 78 have been deployed, as is shown in the upper part of FIG. 7, secondary flow 36 circulating through passage 38 strikes this radial barrier formed by all the deployed shutters 78, and is therefore returned against the flow radially towards the outside, as is shown schematically by arrow 84. In the represented configuration, the air passes between the leading edge of wing 6 and a rear end of nacelle 26 streamlining fan casing 12 and external ferrule 24 of intermediate casing 14.

With this regard, this downstream end of nacelle 26 has the shape of an annular nozzle 90 contributing to the external radial delimitation of passage 38, the aim of which is to be able, depending on its position, to modify the extent of the outlet section of annular passage 38. It is therefore possible to move the nozzle between a position where the outlet section of passage 38 is large, as shown in the lower part of FIG. 7, and a position where the outlet section of passage 38 is smaller, as shown in the upper part of this same figure. In the example shown, this nozzle 90 can be manufactured divided into sectors, i.e. formed by several sectors placed directly one after the other, in the circumferential direction.

With this configuration, it is planned to move nozzle 90 into the most favourable position possible when the turbojet is operating in reverse thrust mode with shutters 78 deployed, as is shown in the upper part of FIG. 7.

Figure 8:
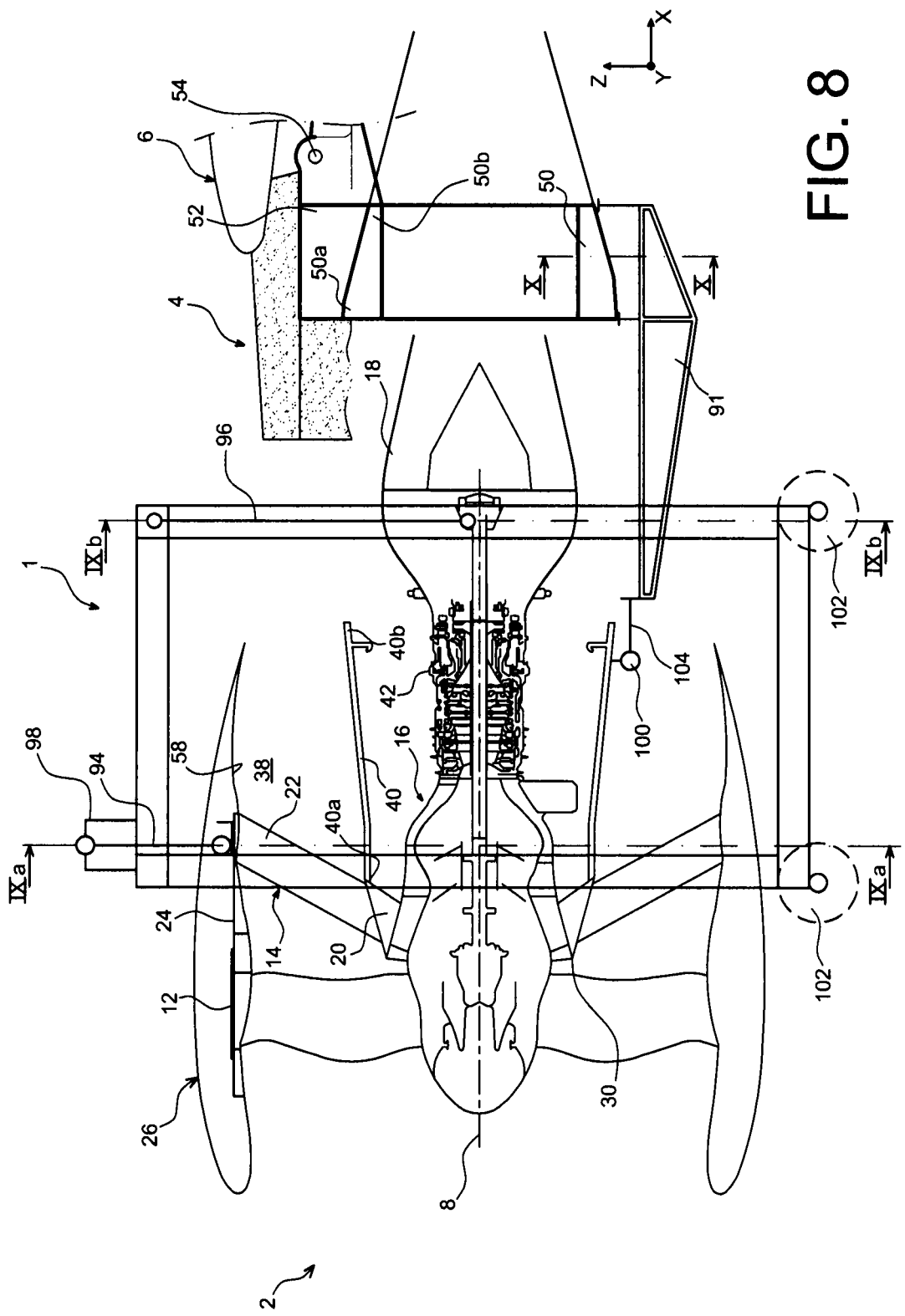
FIG. 8 represents a schematic view of tools allowing the turbomachine to be assembled on the attachment strut.
Figure 9:
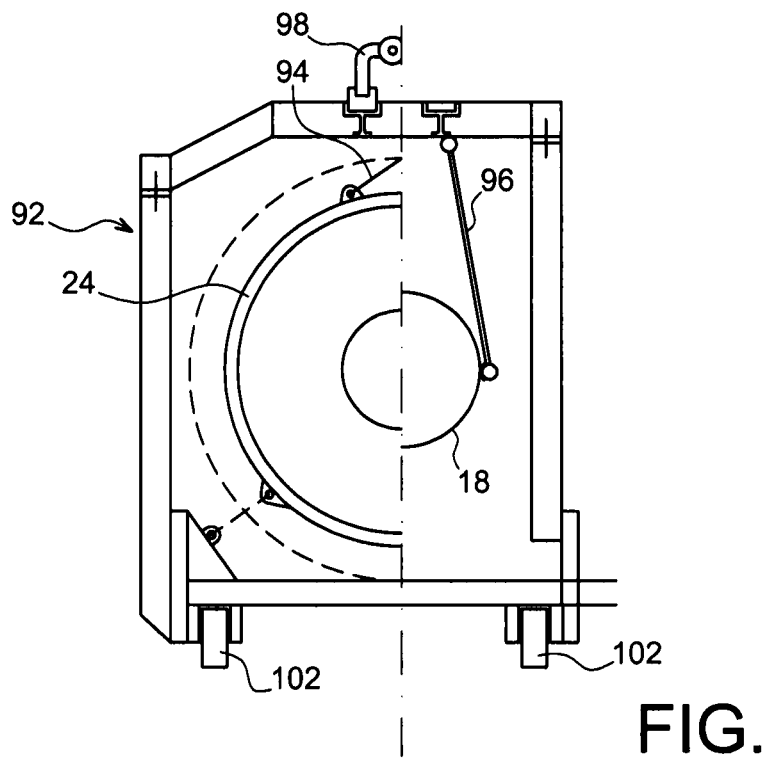
FIG. 9 represents a section view the left part of which is seen along line IXa-IXa of FIG. 8, and the right part of which is seen along line IXb-IXb of this FIG. 8.
Figure 10:
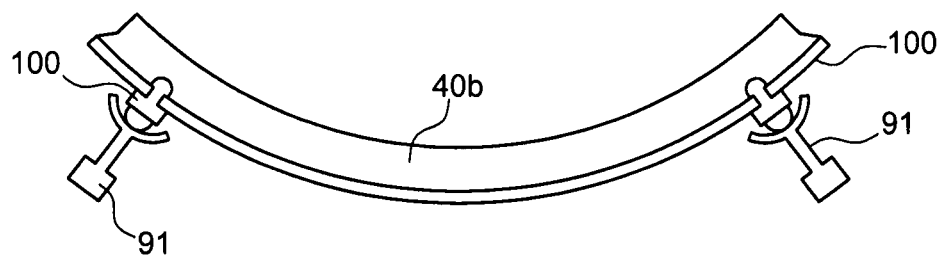
FIG. 10 represents a section view along line X-X of FIG. 8.

With reference to FIGS. 8 to 10, a preferred manner of installing turbojet 2 on attachment strut 4 is shown. To accomplish this, attachment strut is firstly put in place on wing 6, such that it protrudes underneath it. Secondly, several guide rails are mounted temporarily on second structural case 50, for example two rails 90 placed in angular positions corresponding to four o'clock and eight o'clock. These rails 91 are positioned so as to present raceways roughly aligned in direction X. In addition, turbojet 2 fitted with its nacelle 26 is assembled suspended on a dolly 92. To accomplish this, it is planned that external ferrule 24 of intermediate casing 14 is suspended using two cables 94, and ejection casing 18 suspended using two cables 96. These suspensions are connected to a drive mechanism 98 assembled on dolly 92, enabling the position of turbojet 2 to be adjusted in each of the directions X, Y and Z relative to this dolly 92. In addition, two bearing systems 100 are connected temporarily to downstream end 40b of the first case 40, also at angular positions corresponding to four o'clock and eight o'clock, such that they are able to cooperate with the two rails 90 installed to this end.

Thus, turbojet 2 suspended from dolly 92 is moved in direction X relative to attachment strut 4, which remains stationary, by moving dolly 92 assembled on wheel 102. Each bearing 100 can be fitted with a mechanical sight system 104 which projects forwards, enabling it to be ascertained that each bearing 100 is positioned in the axis of its associated rail 91, such that it is able to roll on the latter. When this condition is met the trolley can continue to be moved in direction X so as to establish the cooperation between bearings 100 and their associated rails 91, and the movement can then be continued until ejection casing 18 enters within the internal space defined by second structural case 50. When the relative position between turbojet 2 and mounting strut 4 has been established, the mechanical connection is made between upstream end 50a of case 50 and downstream end 40b of case 40, which preferably constitutes the sole mechanical connection between rigid structure 46 of the mounting strut and turbojet 2. After this, turbojet 2, which is attached securely under wing 6 by mounting strut 4, can be uncoupled from frame 92 of the rig, and rails 91 can be removed from second case 50.

Naturally, various modifications can be made by the skilled man in the art to the invention which has just been described, solely as non-restrictive examples.

The invention claimed is:

1. An engine assembly for an aircraft, comprising:
   a dual-flow turbomachine; and
   an attachment strut to mount the turbomachine configured to be connected to an element of the aircraft, wherein
   the turbomachine includes a fan casing and an intermediate casing positioned downstream of the fan casing and including a hub supporting structural arms,
   wherein the attachment strut includes a primary structure to transmit forces,
   wherein the turbomachine further includes a first structural case extending downstream of the hub of the intermediate casing, wherein the first structural case contributes to an internal radial delimitation of a passage for a secondary flow of the turbomachine,
   wherein the primary structure of the attachment strut includes a second structural case, assembled on the first structural case, and positioned directly downstream of the first structural case, to also contribute to the internal radial delimitation of the passage for the secondary flow, wherein the primary structure of the attachment strut also includes an offset structure positioned in the passage for the secondary flow, a portion of the offset structure extending downstream with respect to a downstream end of the second structural case, and the portion of the offset structure is configured to connect the second structural case to the aircraft element, and
   wherein the second structural case includes a thrust reversal system.

2. An engine assembly according to claim 1, wherein a junction between the first and second structural cases is located downstream of a combustion chamber of the turbomachine.

3. An engine assembly according to claim 1, wherein the downstream end of the second structural case is located close to a junction between a gas generator casing of the turbomachine, and a gas ejection casing of the turbomachine.

4. An engine assembly according to claim 1, wherein at least one of the first structural case and the second structural case is connected to a gas generator casing of the turbomachine using multiple connecting rods distributed circumferentially and positioned generally tangentially relative to the gas generator casing.

5. An engine assembly according to claim 1, wherein the second structural case is connected to at least one of a gas generator casing of the turbomachine, and a gas ejection casing of the turbomachine, by multiple preload spring systems distributed circumferentially.

6. An engine assembly according to claim 1, wherein the first structural case is perforated by access panels covered by one or more shutters.

7. An aircraft comprising at least one engine assembly according to claim 1.

8. An aircraft according to claim 7, in which the element of the aircraft to which the attachment strut of the engine assembly is connected is one wing of the aircraft or a rear part of a fuselage of the aircraft.

9. A method of assembly of an engine assembly for an aircraft according to claim 1, the method comprising:
   installing, in a removable manner, a guide on the second structural case;
   moving the dual-flow turbomachine along a direction of an axis of the dual-flow turbomachine, in a direction of the second structural case, such that the first structural case is guided by the guide; and
   removing the guide from the second structural case.

10. An engine assembly according to claim 1, wherein the turbomachine includes a nacelle surrounding the fan casing and the intermediate casing, and the thrust reversal system includes a deployable shutter that redirects the secondary flow through a passage between a rear end of the nacelle and a leading edge of a wing of the aircraft.

11. An engine assembly according to claim 1, wherein the turbomachine includes a gas generator casing and a gas ejection casing, the gas generator casing and the gas ejection casing contribute to an outer radial delimitation of a passage for a primary flow, and at least a portion of the passage for the primary flow passes through the first and the second structural cases.

12. An engine assembly according to claim 11, wherein the turbomachine includes a flow separation nozzle positioned upstream of the hub, and the flow separation nozzle separates the primary flow from the secondary flow.

* * * * *